(12) United States Patent  
Schumann et al.

(10) Patent No.: US 7,077,471 B2  
(45) Date of Patent: Jul. 18, 2006

(54) HEIGHT-ADJUSTABLE VEHICLE SEAT WITH A CRASH BLOCKING UNIT

(75) Inventors: Kai Schumann, Rieschweiler-Mühlbach (DE); Ingo Teufel, Rockenhausen (DE); Dieter Braun, Otterberg (DE); Heinrich Hammann, Lohnsfeld (DE)

(73) Assignee: KEIPER GmbH & Co., KG, Kaiserslautern (DE)

( * ) Notice: Subject to any disclaimer, the term of this patent is extended or adjusted under 35 U.S.C. 154(b) by 0 days.

(21) Appl. No.: 11/206,236

(22) Filed: Aug. 17, 2005

(65) Prior Publication Data

US 2005/0275267 A1    Dec. 15, 2005

Related U.S. Application Data

(63) Continuation of application No. PCT/EP04/01082, filed on Feb. 6, 2004.

(30) Foreign Application Priority Data

Feb. 19, 2003    (DE) ................ 103 06 827

(51) Int. Cl.  
*B60N 2/42* (2006.01)

(52) U.S. Cl. ............. 297/216.1; 296/68.1; 297/344.15
(58) Field of Classification Search ............ 297/216.1, 297/216.13, 216.14, 216.15, 216.16, 378.1, 297/378.13, 344.12, 344.15

See application file for complete search history.

(56) References Cited

U.S. PATENT DOCUMENTS

| 4,993,747 | A | 2/1991 | Borlinghaus |
| 5,882,080 | A | 3/1999 | Houghtaling et al. |
| 6,082,817 | A | 7/2000 | Müller |
| 6,089,605 | A | 7/2000 | Müller |
| 6,209,955 | B1 * | 4/2001 | Seibold ............ 297/216.13 |
| 6,244,656 | B1 * | 6/2001 | Mueller ........... 297/216.13 |
| 6,244,661 | B1 * | 6/2001 | Timon et al. ..... 297/378.11 |
| 6,247,752 | B1 | 6/2001 | Bowers |
| 6,296,306 | B1 * | 10/2001 | Specht et al. ..... 297/216.14 |
| 6,299,239 | B1 * | 10/2001 | Sagawa et al. .... 296/187.12 |
| 6,478,378 | B1 | 11/2002 | Mühlberger et al. |
| 6,533,351 | B1 | 3/2003 | Deptolla |

(Continued)

FOREIGN PATENT DOCUMENTS

DE    44 14 031 C1    10/1995

(Continued)

OTHER PUBLICATIONS

U.S. Appl. No. 11/154,969; Filed Jun. 16, 2005; In re: Kai Schumann et al., entitled *Height-Adjustable Vehicle Seat Having a Crash Locking Unit*.

*Primary Examiner*—Peter R. Brown  
(74) *Attorney, Agent, or Firm*—Womble Carlyle Sandridge & Rice, PLLC

(57) ABSTRACT

In the case of a vehicle seat (1), in particular a motor vehicle seat, having at least one four-bar linkage (4), which is defined by four mechanism links, for setting the seat height, and a crash blocking unit (21) which, in the event of a crash, locks at least two of the mechanism links to one another by means of two locking members (23, 25), the crash blocking unit (21) has a passive or switchable element (51) which is separately activated prior to or at the beginning of the crash.

22 Claims, 2 Drawing Sheets

U.S. PATENT DOCUMENTS 6,666,508 B1 12/2003 Hofmann et al.
6,733,075 B1 5/2004 Schumann et al.

FOREIGN PATENT DOCUMENTS

| | | |
|---|---|---|
| DE | 197 38 727 A1 | 3/1999 |
| DE | 199 11 786 C2 | 9/2000 |
| DE | 199 53 630 C2 | 5/2001 |
| DE | 100 25 675 C2 | 12/2001 |
| DE | 100 56 082 A1 | 5/2002 |
| DE | 100 46 204 A1 | 6/2002 |
| DE | 101 37 298 C1 | 10/2002 |
| DE | 101 26 427 A1 | 12/2002 |

* cited by examiner

HEIGHT-ADJUSTABLE VEHICLE SEAT WITH A CRASH BLOCKING UNIT

CROSS-REFERENCE TO RELATED APPLICATION

The present application is a continuation of International Application PCT/EP2004/001082, which was filed Feb. 6, 2004, and is incorporated herein by reference, in its entirety.

BACKGROUND OF THE INVENTION

The present invention relates to a vehicle seat, in particular a motor vehicle seat, having at least one four-bar linkage and a crash blocking unit, wherein, in the event of a crash, the crash blocking unit locks at least two of the links of the four-bar linkage to one another by means of two locking members.

In the case of a vehicle seat of this type known from DE 199 53 630 A1 and corresponding U.S. Pat. No. 6,478,378, in order to relieve the load on the height adjuster drive a crash blocking unit is provided between the seat frame and the rear rocker, with the crash blocking unit being activated by a change in the geometry of the four-bar linkage that is suspended under prestress. However, for certain uses it would be desirable if the four-bar linkage were to experience a change in geometry which is as small as possible.

BRIEF SUMMARY OF SOME ASPECTS OF THE INVENTION

An aspect of the present invention is the provision of improvements to a vehicle seat of the type mentioned immediately above. In accordance with one aspect of the present invention, a vehicle seat, in particular a motor vehicle seat, has at least one four-bar linkage, which is for setting the seat height, and a crash blocking unit which, in the event of a crash, locks at least two of the links of the four-bar linkage to one another by means of two locking members, wherein the crash blocking unit has a passive or switchable element by means of which the crash blocking unit is separately activated prior to or at the beginning of the crash.

Because the crash blocking unit has a passive or switchable element by means of which the crash blocking unit is separately activated prior to or at the beginning of the crash, the locking of the locking members and the resultantly caused blocking of the four-bar inkage can be provided at an early point, with the result that the four-bar linkage experiences only a very small change in geometry, i.e. the locking takes place with a very small movement of the four-bar linkage. Therefore, for example, a belt attachment point fixed on the seat frame is only slightly displaced forward, which significantly increases the efficiency of the seatbelt and of the airbag. The crash force acting on the belt attachment point can be conducted away to the vehicle floor over the most direct route possible without being conducted over soft regions of the four-bar linkage which, due to deformation, have a negative effect on the forward displacement of the belt attachment point. An activation preferably taking place prior to the beginning of the crash renders the solution according to the invention capable of being "pre-saved", which further increases the safety. In addition, the system is reversible in contrast to solutions having shearing pins or the like. The concept of the beginning of the crash is to be understood to be the short period of time from the first contact of the vehicle with the crashing object until the movement of the four-bar linkage is initiated, with it being intended that the movement also includes a movement of the links of the four-bar linkage by a few angular degrees. The element is coupled to at least one of the locking members preferably by means of an auxiliary mechanism.

The activation of the crash blocking unit prior to or at the beginning of the crash can take place under remote control or as a function of the local boundary conditions and can lead directly to a locking of the four-bar linkage or can take place in a positively controlled manner as the four-bar linkage begins to move. Different variants correspondingly arise.

For an activation at the latest at the beginning of the crash, as the four-bar linkage begins to move and with positively controlled locking, a passive element, for example a speed-sensitive damper, may be provided which, at low speeds, permits a movement of the above-mentioned locking member together with the four-bar linkage, for example for height adjustment. When high relative speeds occur between two links of the four-bar linkage, the element builds up a counterforce, i.e. increases the braking torque (blocks) at the latest at the beginning of the crash. The blocking can be used for rapid locking (approximately 5-15 ms) by the element securing, for example, one of the locking members via a connector or the like, and the following kinematic movement in the four-bar linkage resulting in the blocked locking member being positively controlled and therefore in a locking of the two locking members. The actual driving-in movement of the locking member is therefore produced via the blocking of a degree of freedom of the connection of the locking member and the hoisting of the four-bar linkage. Because of the large differences in the occurring speeds between normal use and the crash situation, this type of triggering affords advantages with regard to complexity and rapidity over a conventional, force-controlled triggering mechanism.

For an activation which is possible even prior to a crash and leads, as the four-bar linkage begins to move, to a positively controlled locking, an element which can be switched between two states and is otherwise passive for lack of a change in geometry may be provided, for example a switchable coupling, in particular a damper with a rheological fluid, which, after a switching pulse, for example from the airbag controller owing to a signal from a (pre-) crash sensor, transfers from an unblocked state into a blocked (or at least very significantly damped) state and therefore blocks the locking member in a manner corresponding to the previous variant, with the result that a locking takes place in a positively controlled manner as the four-bar linkage begins to move.

For an activation which is possible even prior to a crash and can lead to direct locking even prior to the four-bar linkage moving, an element which can be switched between two states and is active owing to a change in geometry may be provided, for example an actuator. The activation then preferably takes place by the actuator even prior to the crash, for example in response to a signal of a pre-crash sensor, moving one locking member via the connector and locking it to the other locking member on the four-bar linkage and at least ensuring that they nestle together.

The switchable element can have a blocking effect either in the energized or in the unenergized state. In the first case, the switchable element has to be energized prior to or in the crash situation. In the second case, which ensures trouble free locking if the power supply is interrupted, the switchable element can be energized either permanently, so that the crash sensor cuts off the power supply, or in particular in the case of electrically height-adjustable vehicle seats can be energized only for the height adjustment. At all other times, i.e. even during the crash, a locking member is either permanently blocked or is already in engagement with the other locking member.

The activation preferably takes place irrespective of direction, i.e. both in a head-on crash and in a rear crash, for which purpose the element can likewise become effective in two different directions.

The four links of the four-bar linkage are the frame, which is fixed on the vehicle structure, two rockers (e.g., bars) pivotably mounted to the frame, and a connector that is pivotably mounted to the rockers. Locking of the frame, which is fixed on the vehicle structure, and one of the rockers, as two of the links of the four-bar linkage, enables force to be introduced more successfully into the vehicle structure and the four-bar linkage becomes stiffer overall, so that a further reduction in the change in geometry of the four-bar linkage is achieved.

The crash blocking unit is a combination of a triggering mechanism realized by the element and a locking mechanism realized by the locking members. In one variant which can be produced in a simple manner, the crash blocking unit has, as one locking member, a pawl which is effective in two directions and is mounted pivotably on one of the links of the four-bar linkage, with the other locking member being attached fixedly to another link of the four-bar linkage. In the normal situation, a spring which is preferably provided keeps the pawl in a defined position under prestress, with the result that the crash blocking unit is not actuated when the four-bar linkage is moved in order to set the seat height. A single spring preferably acts in both possible pivoting directions of the pawl. With the element fixed on a link of the four-bar linkage, the coupling between the pawl and the element can be in the form of an auxiliary mechanism. In particular, the auxiliary mechanism can be a linkage of rods and/or levers, for example a linkage with two links and three joints or two joints and a sliding fit, with it being possible for one joint or the sliding fit to be blocked by the element, or by a mechanism, for example a spur gear stage. The auxiliary mechanism can be coordinated with the design of the element to provide an element that is effective in a linear or rotary manner, for example by designing the auxiliary mechanism as an individual retaining rod or as a crank drive. The arrangement of the auxiliary mechanism enables the triggering behavior, in particular the time of triggering, the driving-in movement and the driving-in force, to be suitably influenced.

Other aspects and advantages of the present invention will become apparent from the following.

BRIEF DESCRIPTION OF THE DRAWINGS

The invention is explained in greater detail below with reference to three exemplary embodiments which are illustrated in the drawings, in which.

DESCRIPTION OF EXEMPLARY EMBODIMENTS

Figure 1:
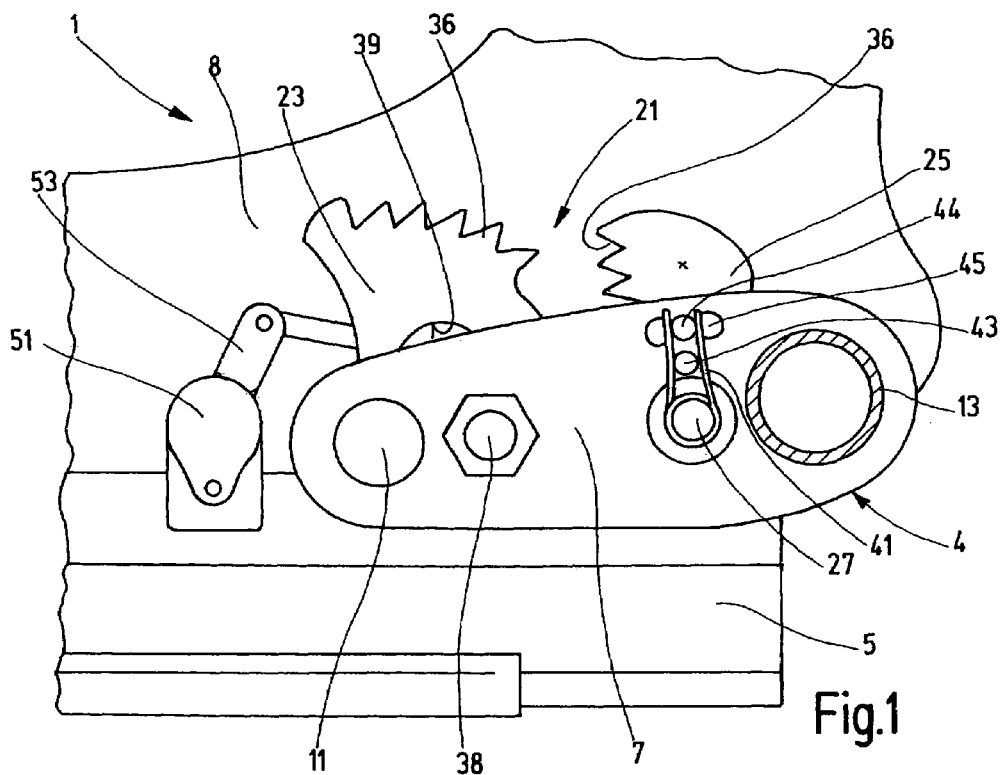
FIG. 1 shows a partially cut-away view of the region of the rear, right corner of the first exemplary embodiment, the view showing the inwardly facing side.
Figure 2:
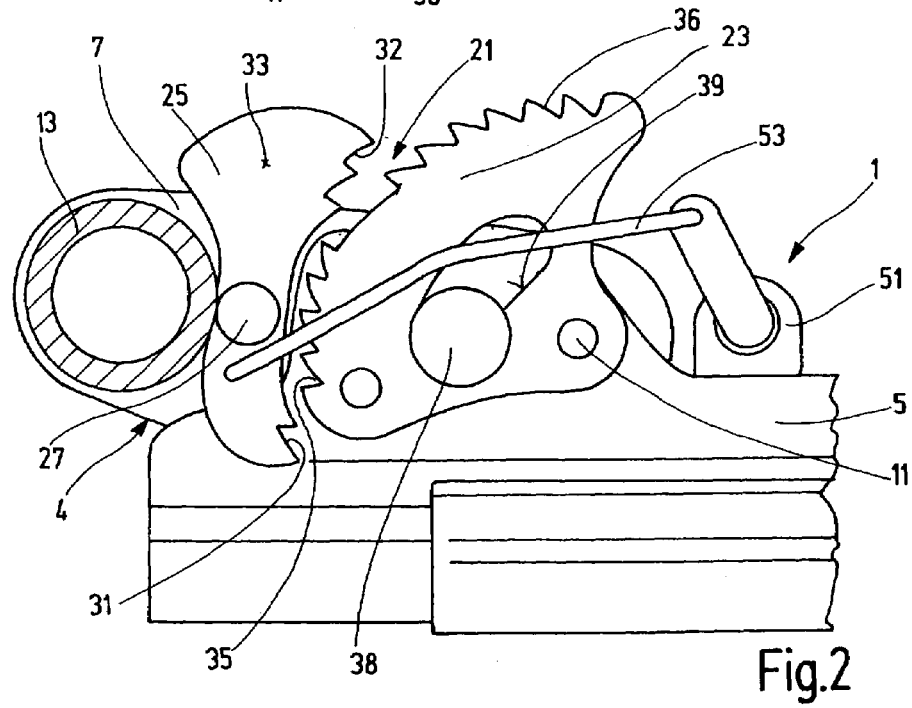
FIG. 2 shows a view corresponding to FIG. 1 showing the outwardly facing side without the seat frame.
Figure 3:
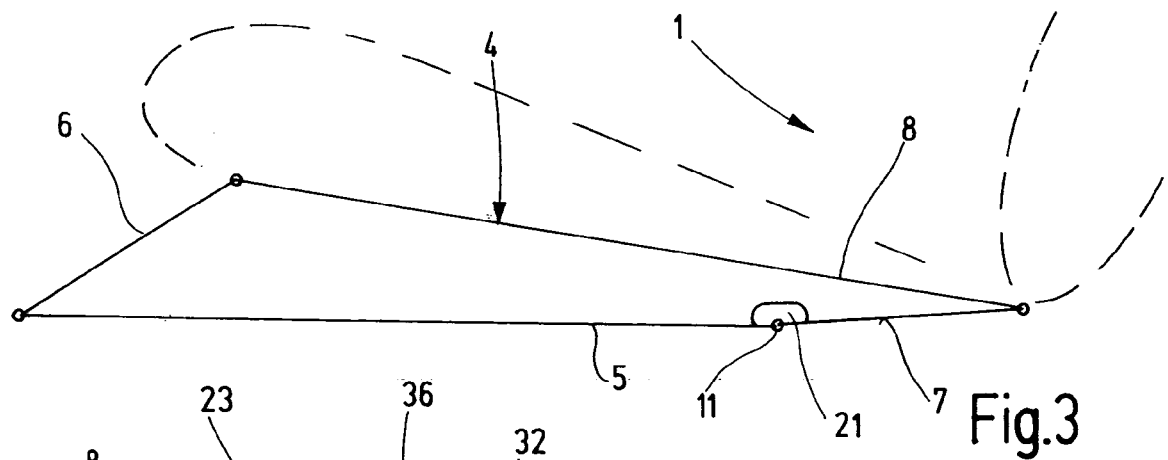
FIG. 3 shows a schematic basic diagram of a vehicle seat with the upholstery illustrated by dashed lines.
Figure 4:
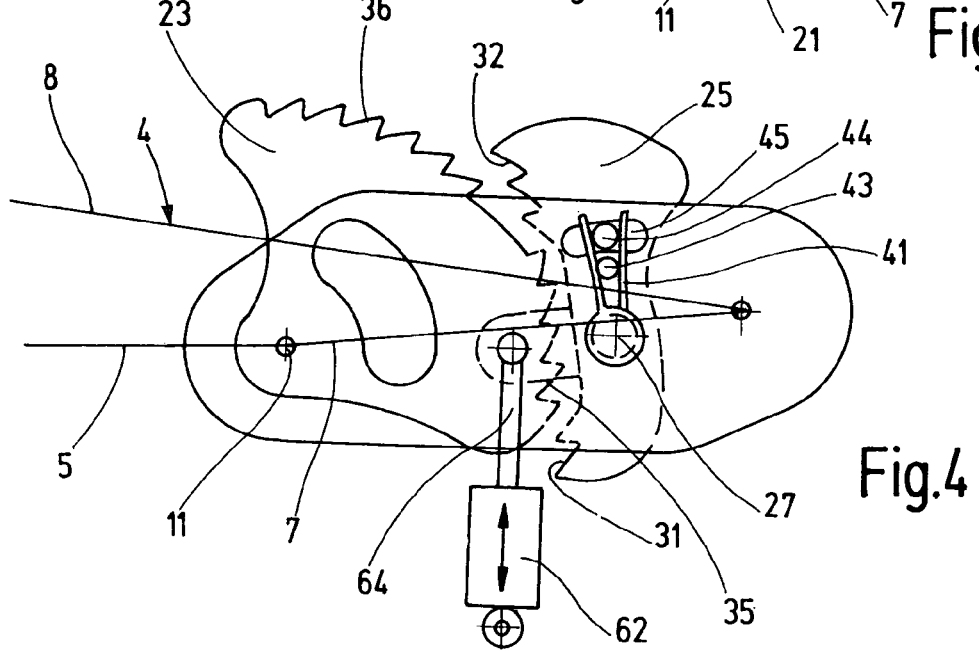
FIG. 4 shows a schematized illustration corresponding to FIG. 1 of the second exemplary embodiment.
Figure 5:
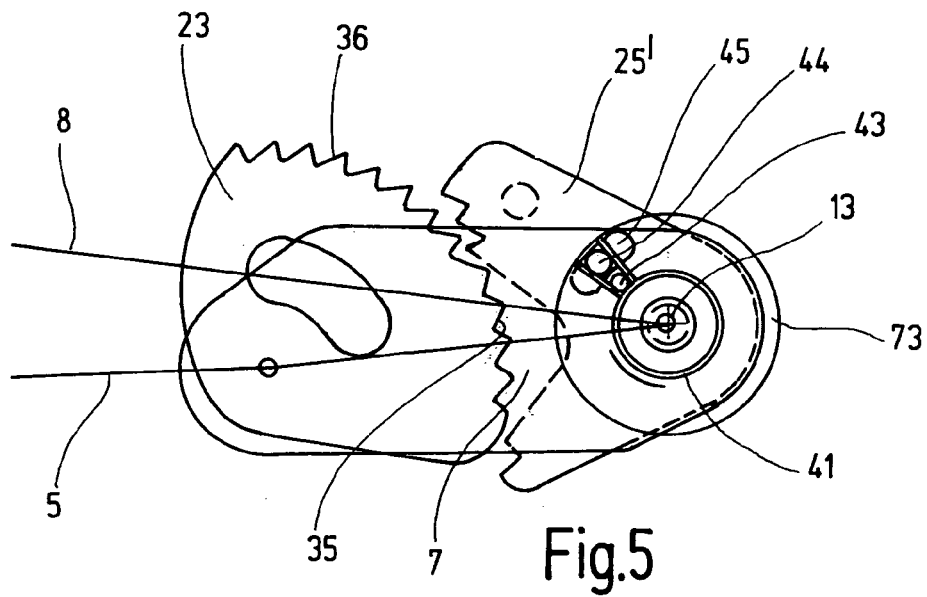
FIG. 5 shows a schematized illustration corresponding to FIG. 1 of the third exemplary embodiment.

In all of the exemplary embodiments, a height-adjustable vehicle seat 1 of a motor vehicle is provided. A four-bar linkage 4 on each side of the vehicle seat serves as the height adjuster. The four-bar linkage 4 comprises four links, namely a frame 5, a front rocker 6, a rear rocker 7, and a connector 8. The frame 5 is to be connected in a manner fixed on the vehicle structure. In the present case, the frame 5 is an upper rail of a pair of seat rails serving as a longitudinal adjuster. The front rocker 6 (e.g., bar) is pivotably mounted to the frame 5. The rear rocker 7 (e.g., bar) is likewise pivotably mounted to the frame 5. The connector 8 is pivotably mounted to both rockers 6 and 7. In the present case, the connector 8 is a side part of a seat frame. The pivoting of the rear rocker 7 on the frame 5 takes place by means of a hinge pin 11. A round cross tube 13 serves as the pivot point between the rear rocker 7 and the connector 8. The round cross tube 13 is also part of the seat frame.

A crash blocking unit 21 of the four-bar linkage 4 locks in the event of a crash. The crash blocking unit 21 has a toothed segment 23 (e.g., a first locking member) attached to the frame 5 and a pawl 25 (e.g., a second locking member) which, in the first two exemplary embodiments, is mounted pivotably on the rear rocker 7 by means of a bearing pin 27. The pawl 25, which is of two-armed design and is arranged approximately vertically, has two regions of teeth, specifically a lower region of teeth 31 and an upper region of teeth 32. The pawl 25 has a center of gravity 33 in the vicinity of the upper region of teeth 32. The teeth of the two regions of teeth 31 and 32 are directed slightly radially outward with respect to the two possible pivoting directions of the pawl 25.

The toothed segment 23, which is curved around the hinge pin 11 and is arranged at a small distance from the pawl 25, is provided as the mating element to the pawl 25. The toothed segment 23 likewise has two regions of teeth, namely a lower toothed segment region 35 and an upper toothed segment region 36. The lower toothed segment region 35 is designed for interaction with the lower region of teeth 31 of the pawl 25, i.e. is provided with teeth which are slightly upwardly directed. The upper toothed segment region 36 is designed for interaction with the upper region of teeth 32 of the pawl 25, i.e. is provided with teeth which are slightly downwardly directed. During a pivoting movement of the rear rocker 7 about the hinge pin 11, the regions of teeth 31 and 32 of the pawl 25 migrate along the toothed segment regions 35 and 36. In order to be able to ensure an interaction in every setting of the four-bar linkage 4, the toothed segment regions 35 and 36 are therefore designed to be longer than the corresponding regions of teeth 31 and 32.

To improve the guidance, a guide pin 38 is fastened to the rear rocker 7 and protrudes through a slotted guide 39 of the toothed segment 23. The slotted guide 39 is curved around the hinge pin 11.

On that side of the rear rocker 7 which faces away from the pawl 25, a spring 41 sits on the bearing pin 27. The spring 41 is designed as a leg spring with two slightly diverging end sections. Between its end sections, the spring 41 holds a pin-shaped first stop 43, and a pin-shaped second stop 44 that is radially further outward as compared to the first stop. The first stop 43 protrudes laterally from the rear rocker 7. The second stop 44 protrudes laterally from the pawl 25 at a position above the bearing pin 27. The second stop 44 protrudes through an aperture 45 and thereby reaches the spring 41. With the aid of the spring 41 and the stops 43 and 44, the pawl 25 is held in both pivoting directions in a defined position under prestress, specifically also during a height adjustment of the vehicle seat 1, i.e. a movement of the four-bar linkage 4.

In all three exemplary embodiments, in the event of a crash, in the context of activating the crash blocking unit 21 prior to or at the beginning of the crash, first of all the pawl 25, which is effective in both directions, is separately prepared ("activated") for a pivoting movement relative to the rear rocker 7, the pivoting movement then taking place during a movement of the four-bar linkage 4, or the pivoting movement is carried out immediately (i.e. the activation takes place as the four-bar linkage moves). In the first case, this pivoting movement leads in a positively-controlled manner and, in the second case, directly, to a toothed engagement of the pawl 25 into the toothed segment 23, specifically, in the case of a rear crash, of the lower region of teeth 31 into the lower toothed segment region 35 and, in the case of a head-on crash, of the upper region of teeth 32 into the upper toothed segment region 36. As a result, the rear rocker 7 and the frame 5 are locked to each other, i.e. the four-bar linkage 4 is blocked, and the entire system becomes stiffer. The crash loads can thus be conducted directly into the vehicle structure and therefore cause only a small deformation in the seat structure. The various exemplary embodiments differ as to how and when the pawl 25 is activated in the event of a crash and as to how and when the locking takes place.

In the first exemplary embodiment, an element 51 is attached to the frame 5. The element 51 is effective in a rotary manner. An end of a crank drive 53 that is in the form of two levers is attached to the element 51. In order to couple the pawl 25 to the element 51, the other end of the crank drive 53 is movably connected to the pawl 25 in the vicinity of the lower region of teeth 31, i.e. below the bearing pin 27. The element 51 is, for example, a rotary damper which, at low angular velocities, i.e. a slow movement of the rear rocker 7 relative to the frame 5, permits a movement of the crank drive 53 and, at high angular velocities, changes into a state with a large braking torque. However, it is likewise possible for the element 51 to be a switchable coupling (rheological fluid in a damper or the like) or an actuator (solenoid switch or the like), which are switched in each case into a blocking state by a crash sensor, specifically, depending on the application, even as early as during sharp braking, i.e. before the actual crash situation. The blocking element 51 as a switchable coupling blocks the pawl 25 via the crank drive 53 while, in the event of being designed as an actuator, it carries out an adjusting movement and brings the pawl 25 into engagement with the toothed segment 23 or at least causes the to pawl 25 and the toothed segment 23 nestle together.

In the case of a damper or a switchable coupling, the four-bar linkage 4 attempts to lower itself (rear crash) or set itself upright (head-on collision) as soon as the crash takes place. The pawl 25, which is entrained at its bearing pin 27 by the rear rocker 7, is blocked by the blocking element 51 and the crank drive 53, i.e. subjected to a braking torque which overcomes the prestressing of the spring 41. As a result, the pawl 25 is pivoted relative to the toothed segment 23 and locks together with the toothed segment 23. The crash blocking unit 21 therefore locks the rear rocker 7 to the frame 5, specifically at a very early phase of the crash. The rapid reaction time enables the forward displacement of the belt attachment point to be reduced.

If the element 51 is designed as a damper, in view of static tests with low test speeds the hinge pin 11 may be spring-mounted in the direction of the frame 5, so that above a limit force the rear rocker 7 is displaceable in the direction of the element 51 and blocks the latter mechanically. The crash blocking unit 21 then blocks as in the event of a crash.

In the second exemplary embodiment, a linearly effective element 62 is attached to the frame 5. The linearly effective element 62 can be a damper, a switchable coupling or an actuator in accordance with the first exemplary embodiment. The element 62 is movably connected to the pawl 25 by means of a retaining rod 64. In the case of a damper, at the beginning of a crash with the build up of a large relative speed of the links of the four-bar linkage or, in the case of a switchable coupling, shortly before the beginning of a crash, the pawl 25 as in the first exemplary embodiment is blocked, with the result that a subsequent movement of the rear rocker 7 results in a locking of the crash blocking unit 21. In the case of an actuator, the pawl 25 locks in response to the adjusting movement of the element 62.

In the third exemplary embodiment, the pawl 25' is designed to be angled to a somewhat greater extent and is mounted on the transverse tube 13. An element 73, again effective in a rotary manner, is fixed between the pawl 25' and the connector 8. The activation of the crash blocking unit 21 and the locking of the pawl 25' to the toothed segment 23 fixed on the frame take place as in the two other exemplary embodiments, i.e., in the case of a damper, a high relative speed of the links of the four-bar linkage at the beginning of a crash causes the pawl 25' to be blocked with respect to the connector and at the same time locked thereon. In the case of a switchable coupling, the pawl 25' can already be blocked shortly before the beginning of a crash, and, in the case of an actuator, the pawl 25' is already driven into the toothed segment 23 by an adjusting movement of the element 73 shortly before the beginning of a crash.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A vehicle seat, comprising:
   at least one four-bar linkage for affecting the vehicle seat's height, wherein
   (a) the four-bar linkage includes four links,
   (b) a first link of the four links is pivotably connected to a second link of the four links at a position, whereby the first and second links are adjacent to one another,
   (c) the first link is pivotably connected to a third link of the four links at a position that is distant from the position where the first link is pivotably connected to the second link,
   (d) a fourth link of the four links is pivotably connected to the second link at a position that is distant from the position where the first link is pivotably connected to the second link, and
   (e) the fourth link is pivotably connected to the third link at a position that is distant from both
      (1) the position where the fourth link is pivotably connected to the second link and
      (2) the position where the first link is pivotably connected to the third link; and
   a crash blocking unit including
   (a) two locking members that are respectively associated with the first and second links of the four-bar linkage in a manner so that (1) the two locking members are disengaged with respect to one another while the crash blocking unit is in an unactivated state, (2) the two locking members automatically come into engagement with one another to thereby lock together at least the first and second links of the four-bar linkage in response to at least one condition selected from the group consisting of (i) the crash locking unit being in an activated state and a relative movement beginning between at least the first and second links of the four-bar linkage, and (ii) the crash locking unit being transitioned from the unactivated state to the activated state, and (b) at least one element by way of which movement of one of the two locking members is restricted in response to a predetermined event, so that the crash blocking unit is transitioned from the unactivated state to the activated state in response to the predetermined event, wherein the element is selected from the group consisting of a passive element and a switchable element.

2. The vehicle seat as claimed in claim 1, wherein the element is:
controlled from a position that is remote from the crash blocking unit, or
activated as a function of conditions at the crash blocking unit.

3. The vehicle seat as claimed in claim 1, wherein
the predetermined event is selected from the group consisting of a crash of predetermined magnitude's beginning and an event prior to the crash of predetermined magnitude.

4. The vehicle seat as claimed in claim 3, wherein:
the predetermined event comprises there being high relative speed movement between at least the first and second links of the four-bar linkage; and
the element comprises a speed-sensitive damper that is mounted
(a) for providing a high breaking torque in response to the predetermined event, and
(b) so that said movement of the one of the two locking members being restricted is by way of the high breaking torque provided by the damper.

5. The vehicle seat as claimed in claim 4, wherein:
a first of the two locking members comprises a pawl that is pivotably mounted on the first link of the four-bar linkage,
the pawl is effective in two directions,
the pawl is coupled to the element by way of an auxiliary mechanism, and
a second of the two locking members is fixedly attached to the second link of the four-bar linkage.

6. The vehicle seat as claimed in claim 5, further comprising a spring for keeping the pawl under prestress in a predetermined position while the crash blocking unit is in the unactivated state.

7. The vehicle seat as claimed in claim 3, wherein the element comprises a switchable coupling.

8. The vehicle seat as claimed in claim 3, wherein:
first of the two locking members comprises a pawl that is pivotably mounted on the first link of the four-bar linkage,
the pawl is effective in two directions,
the pawl is coupled to the element by way of an auxiliary mechanism, and
a second of the two locking members is fixedly attached to the second link of the four-bar linkage.

9. The vehicle seat as claimed in claim 8, further comprising a spring for keeping the pawl under prestress in a predetermined position while the crash blocking unit is in the unactivated state.

10. The vehicle seat as claimed in claim 1, wherein:
the element comprises an actuator; and
said movement of the one of the two locking members being restricted comprises a crash sensor causing the actuator to bring about a movement of the one of the two locking members so that the locking members are brought into engagement with one another or at least nestled together.

11. The vehicle seat as claimed in claim 1, wherein:
the first link of the four-bar linkage comprises a frame for being fixed on a vehicle structure, and
the second link of the four-bar linkage comprises a rocker.

12. The vehicle seat as claimed in claim 1, wherein:
a first of the two locking members comprises a pawl that is pivotably mounted on the first link of the four-bar linkage,
the pawl is effective in two directions,
the pawl is coupled to the element by way of an auxiliary mechanism, and
a second of the two locking members is fixedly attached to the second link of the four-bar linkage.

13. The vehicle seat as claimed in claim 12, further comprising a spring for keeping the pawl under prestress in a predetermined position while the crash blocking unit is in the unactivated state.

14. The vehicle seat as claimed in claim 12, wherein:
second link of the four-bar linkage comprises a frame for being fixed on a vehicle structure, and
the first link of the four-bar linkage comprises a rocker.

15. The vehicle seat as claimed in claim 1, wherein:
the predetermined event comprises there being high relative speed movement between at least the first and second links of the four-bar linkage; and
the element comprises a speed-sensitive damper that is mounted
(a) for providing a high breaking torque in response to the predetermined event, and
(b) so that said movement of the one of the two locking members being restricted is by way of the high breaking torque provided by the damper.

16. The vehicle seat as claimed in claim 1, wherein:
the first link of the four-bar linkage comprises a frame,
the second link of the four-bar linkage comprises a first rocker,
the third link of the four-bar linkage comprises a second rocker, and
the fourth link of the four-bar linkage comprises a connector.

17. The vehicle seat as claimed in claim 16, wherein:
a first of the two locking members comprises a pawl that is pivotably mounted on the first rocker,
the pawl is effective in two directions,
the pawl is coupled to the element by way of an auxiliary mechanism, and
a second of the two locking members is fixedly attached to the frame.

18. The vehicle seat as claimed in claim 17, further comprising a spring for keeping the pawl under prestress in a predetermined position while the crash blocking unit is in the unactivated state.

19. The vehicle seat as claimed in claim 1, wherein the first link of the four-bar linkage comprises an upper seat rail of a pair of seat rails.

20. The vehicle seat as claimed in claim 19, wherein:
- a first of the two locking members comprises a pawl that is pivotably mounted on the second link of the four-bar linkage, and
- a second of the two locking members is fixedly attached to the upper seat rail.

21. The vehicle seat as claimed in claim 1, wherein the two locking members automatically come into engagement with one another to thereby lock together at least the first and second links of the four-bar linkage in response to the crash locking unit being in the activated state and the relative movement beginning between at least the first and second links of the four-bar linkage.

22. The vehicle seat as claimed in claim 1, wherein the two locking members automatically come into engagement with one another to thereby lock together at least the first and second links of the four-bar linkage in response to the crash locking unit being transitioned from the unactivated state to the activated state.

* * * * *

UNITED STATES PATENT AND TRADEMARK OFFICE
CERTIFICATE OF CORRECTION

| | |
|---|---|
| PATENT NO. | : 7,077,471 B2 |
| APPLICATION NO. | : 11/206236 |
| DATED | : July 18, 2006 |
| INVENTOR(S) | : Kal Schumann et al. |

It is certified that error appears in the above-identified patent and that said Letters Patent is hereby corrected as shown below:

Column 7:

Line 62, insert -- a -- before "first"

Column 8:
  Line 33, insert -- the -- before "second"

Signed and Sealed this

Thirtieth Day of January, 2007

JON W. DUDAS
*Director of the United States Patent and Trademark Office*